H. R. STUART.
POWER TRANSMITTING MECHANISM.
APPLICATION FILED FEB. 26, 1918.

1,288,270.

Patented Dec. 17, 1918.

WITNESSES:

INVENTOR.
BY
ATTORNEY.

UNITED STATES PATENT OFFICE.

HARVE R. STUART, OF SPRINGFIELD, OHIO.

POWER-TRANSMITTING MECHANISM.

1,288,270.

Specification of Letters Patent. Patented Dec. 17, 1918.

Application filed February 26, 1918. Serial No. 219,177.

*To all whom it may concern:*

Be it known that I, HARVE R. STUART, a citizen of the United States, residing at Springfield, in the county of Clark and State of Ohio, have invented certain new and useful Improvements in Power-Transmitting Mechanism, of which the following is a full, clear, and exact description.

This invention relates to power transmitting mechanism for cooling fans, adapted to be thrown into and out of operation automatically or manually as occasion requires, the object being to provide a device of this character adapted for use particularly on automobiles where the space required for the radiator fan is limited and a compact, sturdy and reliable mechanism is required. In accordance with my invention, the fan which is usually mounted upon a stub shaft at the forward end of the motor, is associated with a continuously rotating pulley, a frictionally driven armature disk adapted to slide upon a sleeve or hollow shaft carrying the fan, a spring arranged to hold the disk in engagement with the pulley and a concentric electro-magnet which, when energized, opposes the action of the spring, all as will be hereinafter fully described in connection with the accompanying drawings.

Figure 1:
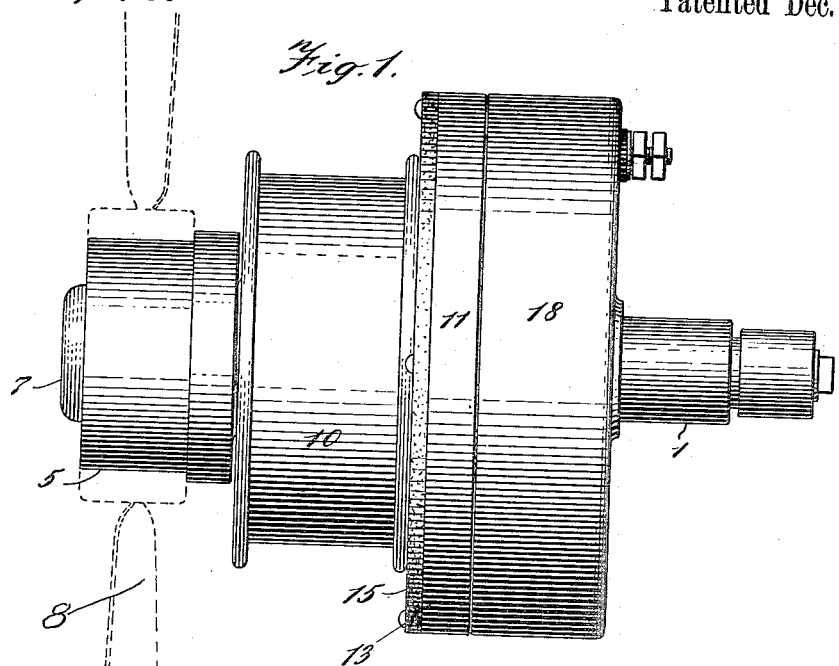
Figure 1 is a side elevation of my improved power transmitting device.
Figure 2:
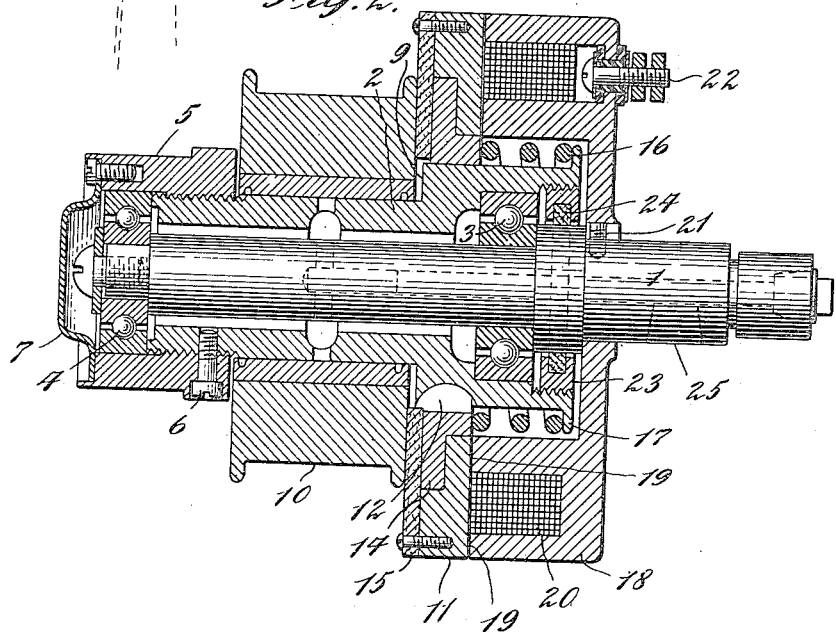
Fig. 2 is a longitudinal central section thereof.

1 indicates a non-rotating shaft suitably equipped at one end (the right hand end, as illustrated) for attachment to the forward end of the motor casting of an automobile. Surrounding this shaft for a considerable portion of its length is a sleeve or hollow shaft 2 which is adapted to rotate upon the shaft by means of two sets of ball bearings 3 and 4. Upon the left hand end of this hollow shaft is screw threaded a hub or collar 5 fixed by means of a set screw 6, the end of which is covered by a dust cap 7. Upon this hub or collar is mounted the fan blade 8 to which power is to be transmitted. The opposite end of the hollow shaft or sleeve is enlarged in diameter forming a shoulder 9 between which and the end of the hub 5, is mounted a pulley or wheel 10 having a suitable bearing upon the outside of the hollow shaft. Upon that part of the hollow shaft of larger diameter is mounted a disk 11 connected to the hollow shaft by means of a spline 12, which permits the disk to slide longitudinally upon the shaft. This disk is composed of an iron portion 13 constituting the armature of an electromagnet presently to be described, and a brass or non-magnetic portion 14. That face of the disk adjacent the wheel 10 is equipped with leather or other suitable frictional material which is adapted to engage with the side of the pulley 10. Against the opposite face of the disk rests a coil spring 16 which surrounds the larger portion of the hollow shaft and bears at its opposite end against a flange 17 formed upon or carried by the hollow shaft. This spring is constantly under tension tending to force the disk against the pulley. Surrounding the rear end of the hollow shaft is a concentric electromagnet, the iron magnetic circuit of which is indicated by 18, having the polar faces 19, and the coil or winding by 20. This electromagnet is mounted upon the non-rotating shaft 1 and is held stationary therewith by the pin 21. Two binding posts, of which only one, 22, is shown, are provided for the terminals of the coil 20. The iron portion of the disk 11 bridges across the two polar faces 19 and is subjected to the magnetic attraction thereof. Between these polar faces and the face of the disk is a clearance of about one-sixteenth of an inch providing for a movement to that extent of the armature disk between the poles of the magnet and the face of the pulley. Between the interior wall of the pulley and the surface of the fixed hollow shaft and the surface of the fixed shaft 1 and outside of the ball bearing 3, is placed a grease dam consisting of a ring 23 carrying a felt washer 24 which bears upon the surface of the fixed shaft; this prevents grease from passing out of the space inside of the hollow shaft. This grease which is required for lubricating the various relatively moving surfaces is supplied through axial and transverse borings shown in dotted lines from a grease cup screwed into the tapped opening 25.

This apparatus operates as follows: The pulley or wheel 10 is to be continuously driven by a belt or gear by the motor of the automobile or any special motor provided for the purpose. Normally the magnet will be deënergized and the spring 16 will hold the disk 11 in frictional engagement with the pulley so that the rotary motion of the pulley will be transmitted through the disk to the hollow shaft 2 and to the fan. This will continue until it is desired or required that the fan shall stop rotating, whereupon the magnet will be energized by closing its circuit either manually or automatically; the armature disk will be withdrawn from engagement with the wheel 10 in opposition to the spring 16, and will be held in contact with the face of the poles of the magnet where there will be sufficient friction to quickly bring the fan to a stop and hold it stationary as long as the current is allowed to traverse the coil of the magnet. When the fan is again required to run, the circuit is broken and immediately the disk is thrown into engagement with the pulley and the fan resumes its rotation.

The stopping of the fan is occasioned by the motor running at too low a temperature, and it is obvious that the circuit of the magnet which controls the stopping and starting of the fan can be opened and closed by hand from a switch placed within the driver's reach, or by means of a thermostat subjected to some portion of the cooling system of the engine. The brass portion 14 of the armature disk is intended to prevent the lines of force from traversing the hollow shaft upon which the disk is mounted.

I claim:

1. In a power transmitting mechanism, the combination of a non-rotating shaft, a rotatable hollow shaft inclosing the same, a sliding armature disk mounted to rotate with said hollow shaft, a driving wheel and a circular electro-magnet mounted opposite the respective faces of the disk, and a spring interposed between a part of the hollow shaft and the disk to force the latter toward the wheel.

2. Power transmitting mechanism for rotary fans comprising the combination of a non-rotating shaft, a hollow rotary shaft surrounding the same, a fan mounted on one end of the hollow shaft, a driving wheel loosely mounted on the hollow shaft, a sliding armature disk mounted upon and adapted to rotate with the hollow shaft and to frictionally engage the driving wheel, a concentric coiled spring carried by the hollow shaft and pressing against the disk, and a concentric stationary electro-magnet adapted to act upon the disk armature in opposition to said spring.

In witness whereof I subscribe my signature.

HARVE R. STUART.